(12) United States Patent
Sbetti et al.

(10) Patent No.: US 11,685,002 B2
(45) Date of Patent: Jun. 27, 2023

(54) METHOD FOR DETECTING THE OPERATING CONDITION OF AN OPTICAL ELEMENT ARRANGED ALONG A PROPAGATION PATH OF A LASER BEAM OF A MACHINE FOR PROCESSING A MATERIAL, SYSTEM FOR CARRYING OUT SAID METHOD AND LASER PROCESSING MACHINE PROVIDED WITH SAID SYSTEM

(71) Applicant: ADIGE S.p.A., Levico Terme (IT)

(72) Inventors: Maurizio Sbetti, Levico Terme (IT);
Davide Gandolfi, Santa Giustina (IT);
Mattia Vanin, Mezzocorona (IT)

(73) Assignee: ADIGE S.p.A., Levico Terme (IT)

( * ) Notice: Subject to any disclaimer, the term of this patent is extended or adjusted under 35 U.S.C. 154(b) by 240 days.

(21) Appl. No.: 17/032,523

(22) Filed: Sep. 25, 2020

(65) Prior Publication Data
US 2021/0101228 A1   Apr. 8, 2021

(30) Foreign Application Priority Data
Oct. 2, 2019   (IT) .................. 102019000017735

(51) Int. Cl.
*B23K 26/21*   (2014.01)
*B23K 26/04*   (2014.01)
*B23K 26/38*   (2014.01)

(52) U.S. Cl.
CPC ............ *B23K 26/21* (2015.10); *B23K 26/048* (2013.01); *B23K 26/38* (2013.01)

(58) Field of Classification Search
CPC ....... B23K 26/38; B23K 26/048; B23K 26/21
USPC ..................................................... 219/121.6
See application file for complete search history.

(56) References Cited

U.S. PATENT DOCUMENTS

| | | | | |
|---|---|---|---|---|
| 8,593,722 | B2* | 11/2013 | Cordingley | G02F 1/33 |
| | | | | 219/121.6 |
| 9,018,562 | B2* | 4/2015 | Dantus | B23K 26/382 |
| | | | | 219/121.76 |
| 2011/0240619 | A1* | 10/2011 | Hayashi | B23K 26/0869 |
| | | | | 219/121.85 |
| 2014/0144895 | A1* | 5/2014 | Stork Genannt Wersborg | ............ |
| | | | | B23K 26/24 |
| | | | | 219/121.75 |
| 2016/0377548 | A1* | 12/2016 | Sappey | G01N 21/9501 |
| | | | | 250/459.1 |

FOREIGN PATENT DOCUMENTS

| | | | | |
|---|---|---|---|---|
| EP | 3272453 A1 * | 1/2018 | ............ | B23K 26/00 |
| EP | 3272453 A1 | 1/2018 | | |
| JP | S59220294 A | 12/1984 | | |

OTHER PUBLICATIONS

Search Report for IT2019000017735 dated Jun. 18, 2020.

* cited by examiner

*Primary Examiner* — Jimmy Chou
(74) *Attorney, Agent, or Firm* — ArentFox Schiff LLP; Michael Fainberg (57) ABSTRACT

A method and system for detecting an operating condition of an optical element along a propagation path of a power laser beam in a laser processing machine head are based on a first signal of a back-propagating optical radiation at the wavelength of the laser beam; a second signal of a back-propagating optical radiation having a wavelength in the near infrared; a third signal of an optical radiation emitted by the optical element in the infrared in proximity to its surface; a fourth signal which is a function of the time-of-flight of an acoustic wave launched through the volume of the optical element.

22 Claims, 7 Drawing Sheets

METHOD FOR DETECTING THE OPERATING CONDITION OF AN OPTICAL ELEMENT ARRANGED ALONG A PROPAGATION PATH OF A LASER BEAM OF A MACHINE FOR PROCESSING A MATERIAL, SYSTEM FOR CARRYING OUT SAID METHOD AND LASER PROCESSING MACHINE PROVIDED WITH SAID SYSTEM

CROSS REFERENCE TO RELATED APPLICATION

This application claims priority to and benefit of Italian Patent Application No. 102019000017735 filed Oct. 2, 2019, the contents of which are incorporated by reference in their entirety.

FIELD OF THE INVENTION

The present invention relates to laser processing of a material, preferably a metal material, and specifically improvements in a machine for the laser processing of a material, in particular for the laser cutting, drilling or welding of said material.

More specifically, the invention relates to a method and a system for detecting the operating condition of an optical element arranged along a propagation path of a laser beam in a machine for processing a material, in particular for laser cutting, drilling or welding of said material.

According to a further aspect, the present invention relates to a machine for laser processing a material comprising a system for detecting the operating condition of at least one optical element of an optical path for shaping the laser beam.

In the following description and claims, the term "material" and, in the preferred embodiment, "metal material" is used to identify any manufactured article, such as a sheet or an elongated profile having, without distinction, a closed cross section—for example hollow circular, rectangular or square—or an open cross section—for example a flat section or an L-, C-, U-shaped section, etc.

BACKGROUND OF THE INVENTION

In the industrial processing of materials, and of metal sheets and profiles in particular, laser is used as a thermal tool for a large variety of applications that depend on the interaction parameters of the laser beam with the material being processed, specifically on the energy density per volume of incidence of the laser beam on the material, and on the interaction time interval.

For example, by directing a low energy density (of the order of tens of W per mm2 of surface) for a prolonged time (of the order of seconds) on a metal material, a hardening process is carried out, while directing a high energy density (of the order of tens of MW per mm2 of surface) for a time of the order of femtoseconds or picoseconds on the same metal material, a photo-ablation process is carried out. In the intermediate range of increasing energy density and decreasing processing time, the control of these parameters allows welding, cutting, perforation, engraving, marking processes to be carried out.

In many processes, including drilling and cutting processes, it is necessary to provide a flow of an assist gas at the processing region where the interaction between the laser beam and the material takes place, which has mechanical functions of propulsion of the melt, or chemical functions to assist combustion, or technological functions of shielding from the surrounding environment of the processing region.

In the field of laser processing of materials, laser cutting, drilling and welding are processes that may be carried out by the same machine, which is adapted to generate a high-power focused laser beam having a predetermined transverse power distribution at at least one working plane of the material, typically a laser beam with a power density between 1 and 10000 kW/mm$^2$, and to control the direction and the position of incidence of the beam along the material. The difference between the different types of processing that may be carried out on a material is substantially attributable to the power of the laser beam used and the interaction time between the laser beam and the material being processed.

Figure 1:
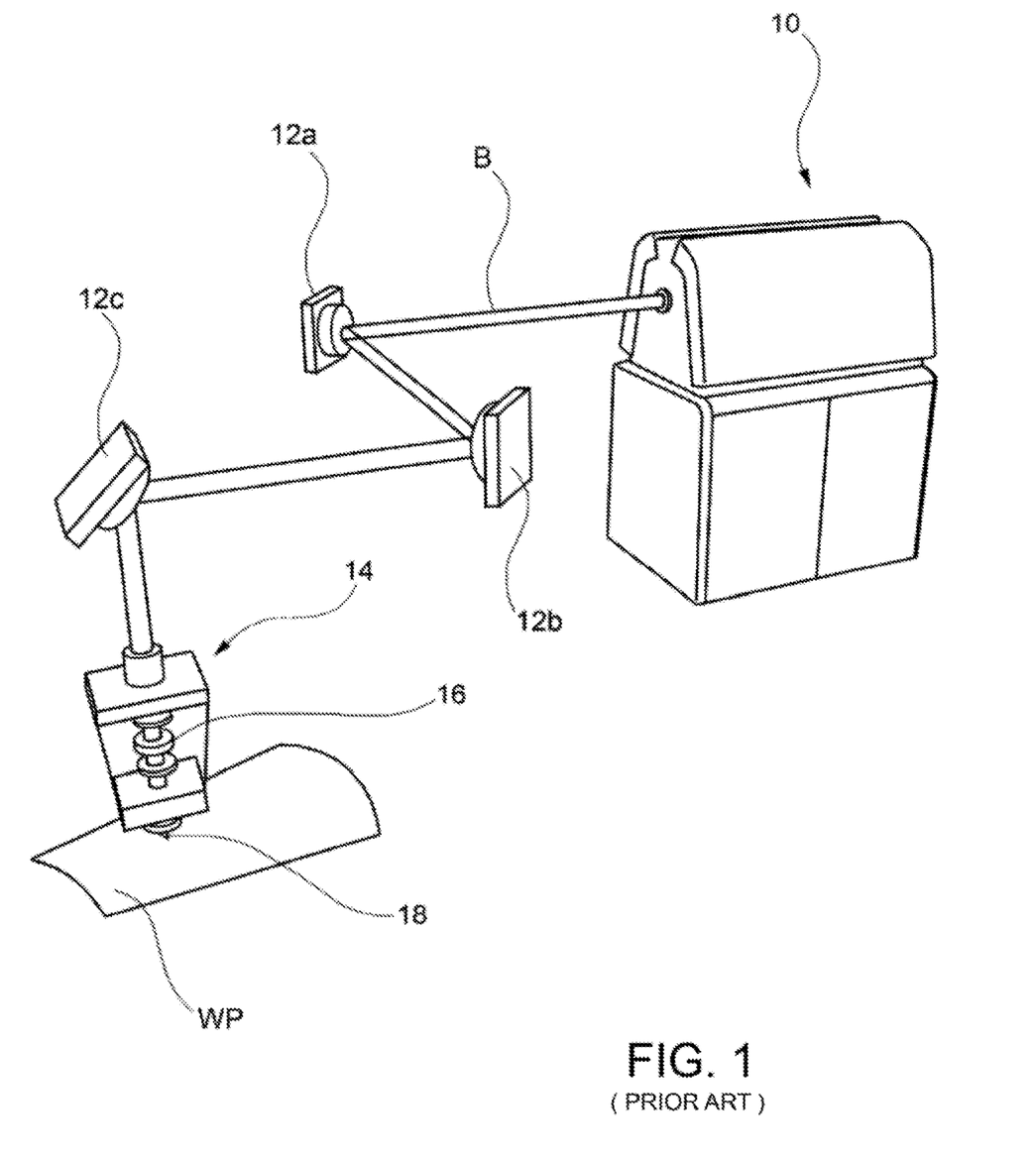
FIGS. 1 and 2 are examples of laser processing machines according to the prior art.
Figure 2:
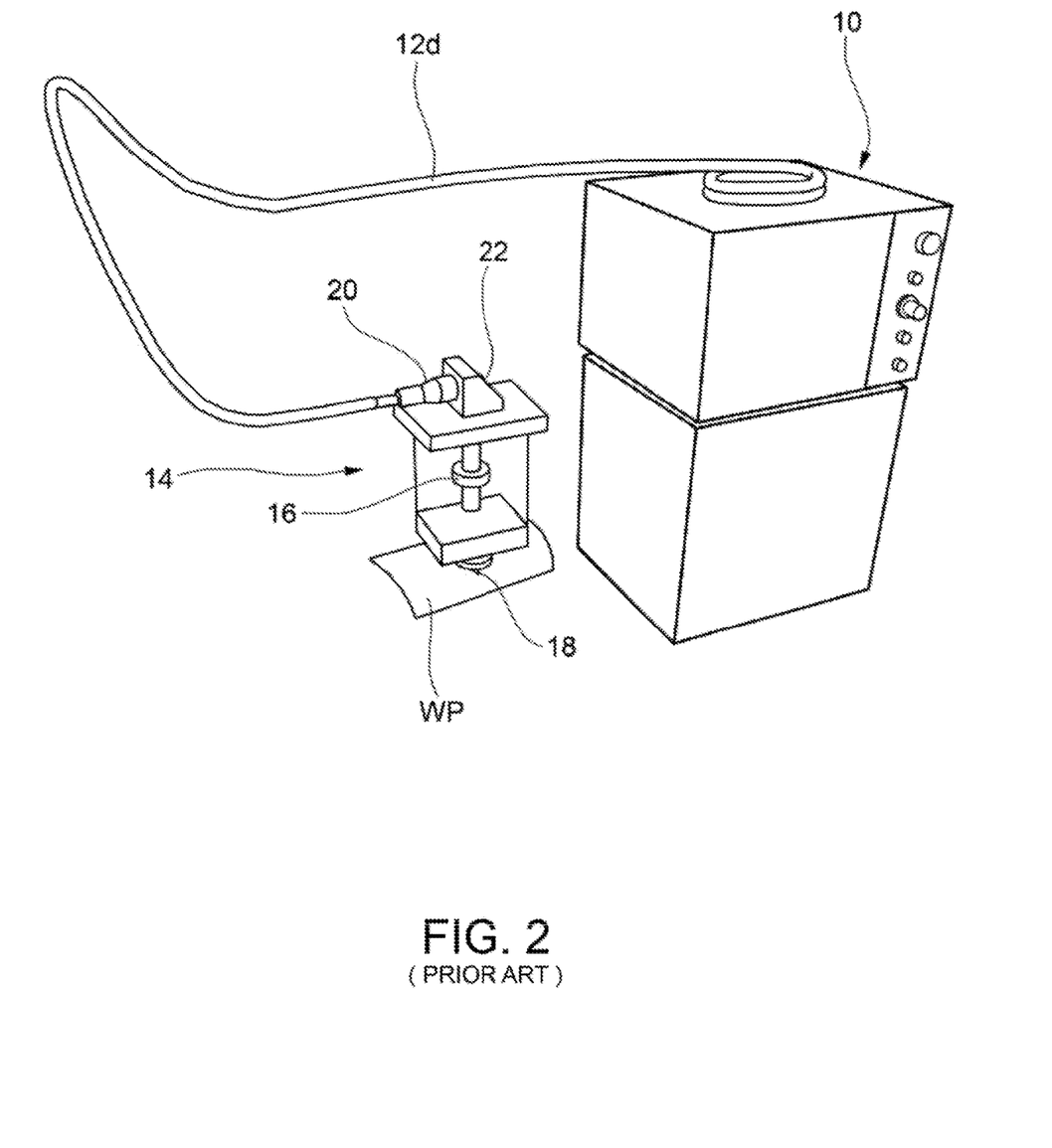

Laser processing machines according to the prior art are shown in FIGS. 1 and 2, and described for example in EP 3 272 453 by the same Applicant.

FIG. 1 schematically shows a machine for industrial processing based on a CO$_2$ laser with an optical path of the laser beam in the air, which includes an emission source 10, such as a CO$_2$ laser generator device, adapted to emit a single-mode or multimode laser beam B, and a plurality of optical components, including reflecting mirrors 12a, 12b and 12c adapted to convey the laser beam emitted by the emission source along an optical path for transporting the beam towards a processing head indicated as a whole with reference numeral 14, arranged in proximity to a material WP. The processing head 14 comprises an optical focusing system 16 for the laser beam, generally consisting of a focusing lens, adapted to focus the laser beam along an optical propagation axis incident on the metal material. A nozzle 18 is arranged downstream of the focusing lens and is crossed by the laser beam directed towards an area of a working plane of the material. The nozzle is adapted to direct a beam of an assist gas injected by a corresponding plant not shown towards the processing area on the material. The assist gas is used to control the execution of a process (drilling or cutting) as well as the achievable processing quality. For example, the assist gas may include oxygen, which promotes an exothermic reaction with a metal such as the oxidation of iron—which generates various types of iron oxides through an exoenergetic reaction, releasing energy into the material which contributes, together with that released by the laser beam, to maintaining a dynamic equilibrium of the process—allowing the cutting speed to be increased, or an inert gas such as nitrogen which does not contribute to the melting of the material, but carries out a propulsive function of the melted material itself, protects the (metal) material from unwanted oxidation at the edges of the processing profile, protects the processing head from any splashes of the melt and may also be used to cool the sides of the groove produced on the material, confining the extent of the thermally altered zone.

FIG. 2 schematically shows a machine for industrial processing with a laser beam launched in optical fiber. It comprises an emission source 10, such as a laser generator device capable of launching a laser beam into a transport fiber, for example a ytterbium-doped fiber laser, or a direct diode laser, adapted to emit a single-mode or multimode laser beam, and an optical component, including an optical fiber cable 12d adapted to convey the laser beam emitted by the emission source towards the processing head 14 arranged in proximity to the material WP. At the processing head, the laser beam emerging from the fiber with its own controlled divergence is collimated by a collimating dioptric system 20 and reflected by a catoptric system 22 before being focused through an optical focusing system 16, generally consisting of a focusing lens, along an optical propagation axis incident on the material WP passing through the emission nozzle 18.

Figure 3:
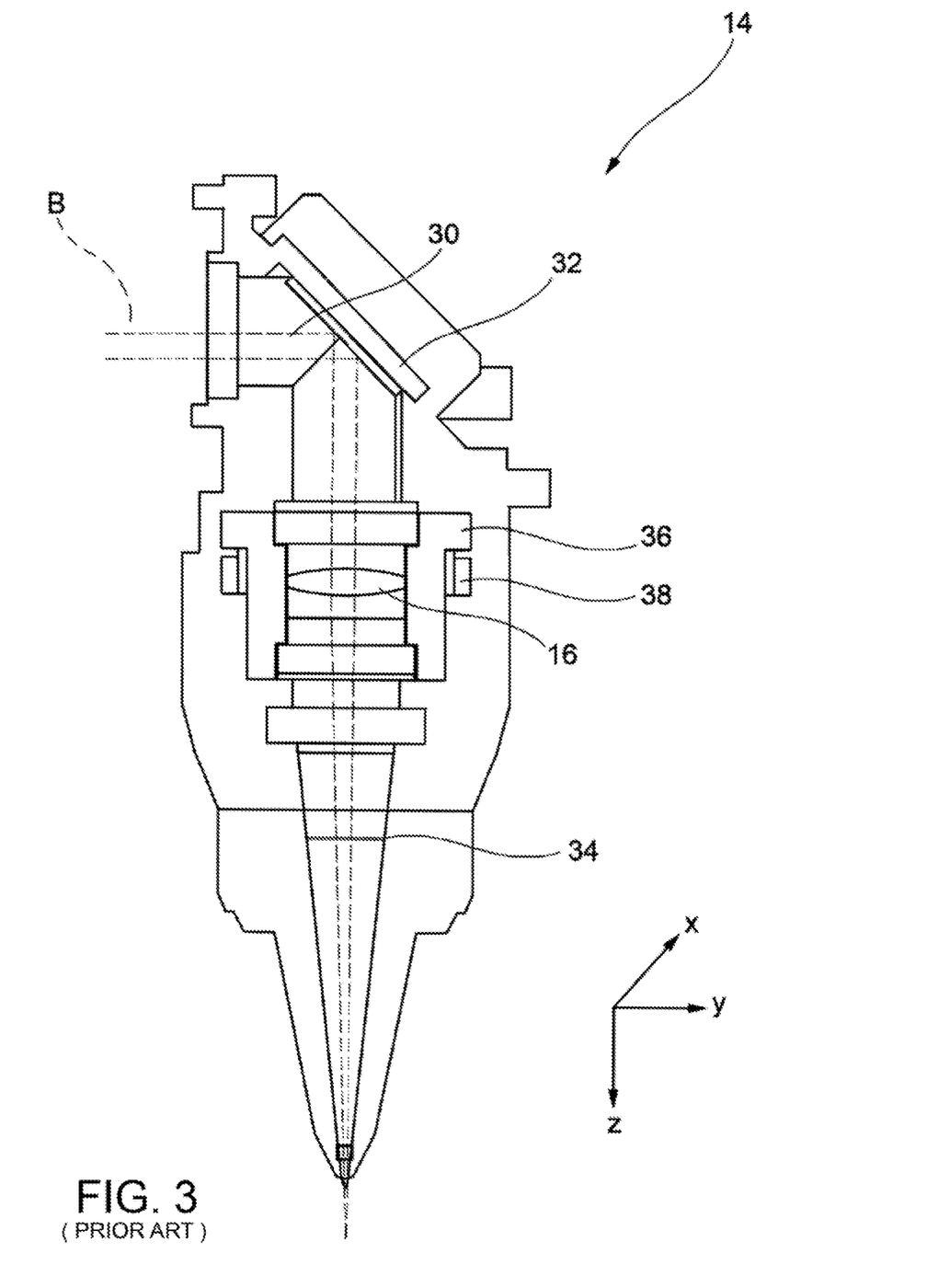
FIG. 3 shows an example of structure of a processing head of a laser machine according to the prior art.

FIG. 3 exemplifies a processing head 14 according to an embodiment of the prior art. Reference numeral 30 indicates a tubular channel having cylindrical or conical sections within which the laser beam is transmitted, indicated with B. The laser beam B generated by the emission source 10 is transported to the processing head through an optical path in the air with multiple reflections or in optical fiber, collimates on a reflecting deflector element 32 which deflects the optical propagation axis thereof in a direction of incidence on the material being processed. The optical focusing system 16 is intermediate between the reflecting deflector element 32 and a protective glass 34 arranged downstream, adapted to protect the focusing system from any splashes of the melt, and comprises a lens-holder unit 36 to which mechanical adjustment mechanisms 38 are coupled for calibrating the positioning of the lens transversely to the direction of propagation of the beam (axes X-Y) and in the direction of propagation of the beam (axis Z).

As a first approximation, an ideal laser beam, that is a laser beam ideally collimated in parallel beams, downstream of the optical focusing system is concentrated in a focusing spot of finite size at its waist. Generally, in industrial processing uses, the optimal process condition is reached with a position of the transverse plane corresponding to the waist of the beam precisely defined even by a tenth of a millimeter with respect to the wall of the incident material of the beam and to the wall of the output material of the beam.

The power density distribution of a normally collimated laser beam is typically Gaussian shape with rotational symmetry in the case of a single-mode beam, i.e. with power concentrated around the longitudinal axis of the beam (axis Z) and gradually decreasing along a peripheral skirt, or it may be described as the envelope of Gaussian profiles with rotational symmetry, in the case of a multimode beam.

The use of single-mode or multimode laser radiation beams which may be described in a first approximation as Gaussian, in the field of high-power laser applications responds to technological control needs. In fact, a Gaussian beam is easily described by few parameters, and it is easily controllable in its propagation along an optical transport path from an emission source to the head of a processing machine because it has the characteristic of propagating without modifying the power distribution, therefore it may be described by a radius value and a divergence value in far-field propagation conditions (in which case a geometric optics approximation may be used). In the near-field propagation conditions of the focused beam, along a processing trajectory where the geometric optics approximation is no longer valid, the beam still maintains the Gaussian shape of the power distribution in each of its cross sections.

On the contrary, a laser beam comprising transverse modes of higher order has a non-Gaussian power distribution. Typically these conditions are obtained through the use of dioptric systems (optical systems of the transmissive type, i.e. lenses) or catoptric systems (optical systems of the reflective type, i.e. mirrors) which modify the shape of the beam starting from a Gaussian distribution.

The transverse power distribution of the beam may be controlled—even in real time—for example according to a wider power distribution with respect to the Gaussian distribution for cutting operations on large thicknesses of the material, (where "large thickness" means, for laser with a wavelength in the near infrared, a thickness between about 4 mm and about 25 mm), according to a narrow power distribution compared to the Gaussian distribution for fast cutting operations on thin thicknesses (where "thin thickness" means a thickness equal to or less than 4 mm), or according to other selectable shapes of the power distribution with non-rotational symmetry.

The control of the direction of propagation or of the forms of distribution of the transverse power of the laser beam other than the Gaussian form and possibly with symmetry other than the rotational one on the material processing area, for example in relation to the controlled distribution of an assist gas or depending on the processing path to be followed and the type of process to be carried out, brings advantages to the process. For example, an imbalance of the position of the optical axis of the laser beam with respect to the axis of symmetry of the assist gas flow in the direction of advancement of a cutting process allows for a better performance in terms of process speed, ensuring a lower gas consumption. The control of the power distribution of a laser beam, possibly with breaking of the rotational symmetry of the beam, may allow the power distribution to be localized or expanded where needed in relation to the processing trajectory and a part of the laser power available to be exploited for ancillary operations of the main process.

It is clear that the control of the direction of propagation of the laser beam or of the forms of distribution of the transverse power of the laser beam should be as precise and repeatable as possible, in order to obtain the indicated advantages. For this reason, it is necessary that the optical elements arranged along the propagation path of the laser beam, in particular but not exclusively the optical elements for shaping the laser beam arranged in the processing head of the machine, have structural integrity and are free from surface impurities. These elements are in fact subject to damage or simple wear due to exposure to adverse physical operating and environmental conditions, in particular in the application areas of laser processing of high power materials, i.e. with laser beam powers equal to or greater than 700 W. For example, the collimation lens of the beam entering the processing head, any deflecting mirrors of the beam and the focusing lens may be exposed to high operating temperatures, determined by the incidence of the processing laser beam, which may cause cracks or structural deformations inside the volume of the optical element. On the other hand, the optical protective element of the optics, provided at the output of the laser beam from the optical path and facing a nozzle for supplying the assist gas, beyond being exposed to high operating temperatures, determined by the incidence of the processing laser beam, is exposed to high environmental pressures present in the nozzle chamber, which is the volume region to which the optical element faces, or better still to high pressure differences between the region upstream of the optical element—ideally at ambient pressure—and a region downstream of the optical element—at the pressure of the assist gas (typically, from 1 to 25 bar)—in the volume of the head in which the optical element is immersed. The surface of the optical protective element facing the material being processed is also exposed to jets of molten material during processing, which cause it to become dirty and consequent opacification thereof.

An altered state or operating condition of an optical element arranged along the propagation path of the laser beam, of a structural and/or superficial nature, i.e. a state of structural defect (non-integrity) and surface impurity of the element, would compromise the optical functionality of the element and therefore the geometric and optical characteristics of the processing laser beam that passes through it, and in general the operation of the machine. For example, this would directly affect the degree and position of focus so that the optical system of the machine would no longer focus the laser beam in a known and consistent manner over time.

For these reasons, in the field of laser processing it is desirable to be able to determine the state or operating condition of an optical element as soon as possible, when the results of the processing still do not exceed the permitted tolerances, instead of noticing an unacceptable operating state and the need to replace the element by simple visual inspection (where possible) of the element itself or of the (compromised) result of a process, so as to be able to restore operating conditions closer to the ideal conditions of intact and clean optical elements for which the processing beam is precisely controlled without spurious alterations of its power distribution or of the incidence spot on the material being processed.

US 2016/377548 describes a system and a method for detecting and classifying defects in a sample of semiconductor material, through an optical analysis.

JP S 59220294 describes the detection of acoustic waves generated by a workpiece subjected to laser processing for the control of processing operations.

SUMMARY OF THE INVENTION

The present invention aims to provide a method for detecting the operating condition of at least one optical element arranged along an optical propagation path of a laser beam in a machine for laser processing of a material and in particular for detecting the operating condition of at least one optical element in a fast and objective manner, in order to obtain precise processing results in all operating conditions.

A further object of the present invention is to provide a method for detecting the operating condition of at least one optical element arranged along an optical propagation path of a laser beam in real time and continuously during the laser processing of a material, without need for a machine stop and a visual or laboratory inspection of the optics of the processing head.

According to the present invention, these objects are achieved by a method for detecting the operating condition of at least one optical element having the features described and claimed herein.

Particular embodiments are also described.

A further object of the present invention is a system for detecting the operating condition of at least one optical element and a machine for the laser processing of a material, as claimed.

In summary, the present invention results from the consideration that the volume conditions and the surface state of an optical element, be it of the transmissive or reflective type, which include, by way of example, the mechanical stress to which the volume of the element is subjected (deformations transversal to the propagation axis of the processing laser beam), the mechanical surface tension at the exposed surfaces of the element (deformations in the axial direction in the direction of the propagation axis of the processing laser beam), the operating temperature conditions of the element and the opacity of the element, may be deduced from the phenomena of back-reflection or diffusion of the processing laser beam by the element, of thermal emission by the element in a spatial region surrounding it and of propagation of an acoustic wave in the volume of the element.

According to the invention, the application of the above considerations to a machine for the laser processing of a material, in particular for laser cutting, drilling or welding, and in particular to the optical elements for shaping the processing laser beam arranged along the direction of propagation of the beam in the processing head of the machine is achieved through the arrangement of sensor means upstream of the laser beam propagation section through the processing head, and of sensor means at at least one optical element to be monitored, and preferably of all the optical elements arranged in the propagation path of the laser beam in the processing head, which include—from upstream to downstream—an optical collimation system, a possible optical system for reflecting and shaping the beam, an optical focusing system, an optical system for protection from the external environment at the output of the laser beam from the optical path, for example an optical element for protecting an environment of the optical path intended not to modify the transverse power distribution of the incident beam when its structural and surface condition is an initial optimum condition.

The measurement of physical quantities indicative of the back-reflective or diffusion of the processing laser beam, of the thermal emission by the element in a spatial region surrounding it and of the propagation of a bulk acoustic wave associated with one or each optical element, suitably processed, allows acquiring a signature of the conditions of the optical path of the processing laser beam through the optical element under consideration and possibly upstream thereof, depending on the location of the sensor means along the propagation path.

The present invention is therefore based on the principle of detecting inspection signals of a different nature in different positions of the optical path, indicative of the operating conditions of one or more optical elements interposed along the path, and acquiring process information and information relating to the nature of the material being processed superimposed on the information relating to the optical elements, with continuity or predetermined periodicity and in real time, and processing this information by combining it in real time and separating the information deriving from the process from the information on the optical elements in order to generate a synthetic data in levels which informs about the state of wear and cleanliness of a set of optical elements forming part of the monitored path.

The aforementioned levels may be directly associated with signals to which the machine or an operator must react, indicative, by way of example, of operating conditions such as: "element not correctly in place," "element in place and in perfect condition," "element in remediable wear or dirt conditions," "element in wear or dirt condition that cannot be remedied," "critical pre-breakage condition that requires a direct and immediate intervention".

Preferably, the acquisition of the inspection signals and the consequent processing of the synthetic data indicative of the operating condition occurs with a periodicity compatible with the production rate, for example at each loading of a new profile or a new sheet or at the end of the processing of a workpiece, or of a geometry in a workpiece.

Advantageously, the automatic control implemented by the method of the invention may be implemented in real time with operating frequencies ranging from 10 Hz, in the case of slow signals, i.e. directly related to thermal processes inside the optical elements, to 10 kHz in the case of fast signals, i.e. related to optical emissions such as the diffusion of the laser beam as it passes through the optical elements, for example by sampling the signals every 25 us and their cumulative processing every 500 us.

A control system adapted to carry out the method of the invention advantageously differs from the systems of the prior art because it may be integrated into a processing head.

BRIEF DESCRIPTION OF THE DRAWINGS

Further features and advantages of the invention will be explained in greater detail in the following detailed description of an embodiment thereof, given by way of non-limiting example, with reference to the accompanying drawings, wherein.

DETAILED DESCRIPTION

FIGS. 1 to 3 have been previously described with reference to the prior art, and their contents are referred to herein as they are common to the implementation of a controlled processing machine for carrying out a method according to the teachings of the present invention.

Figure 4:
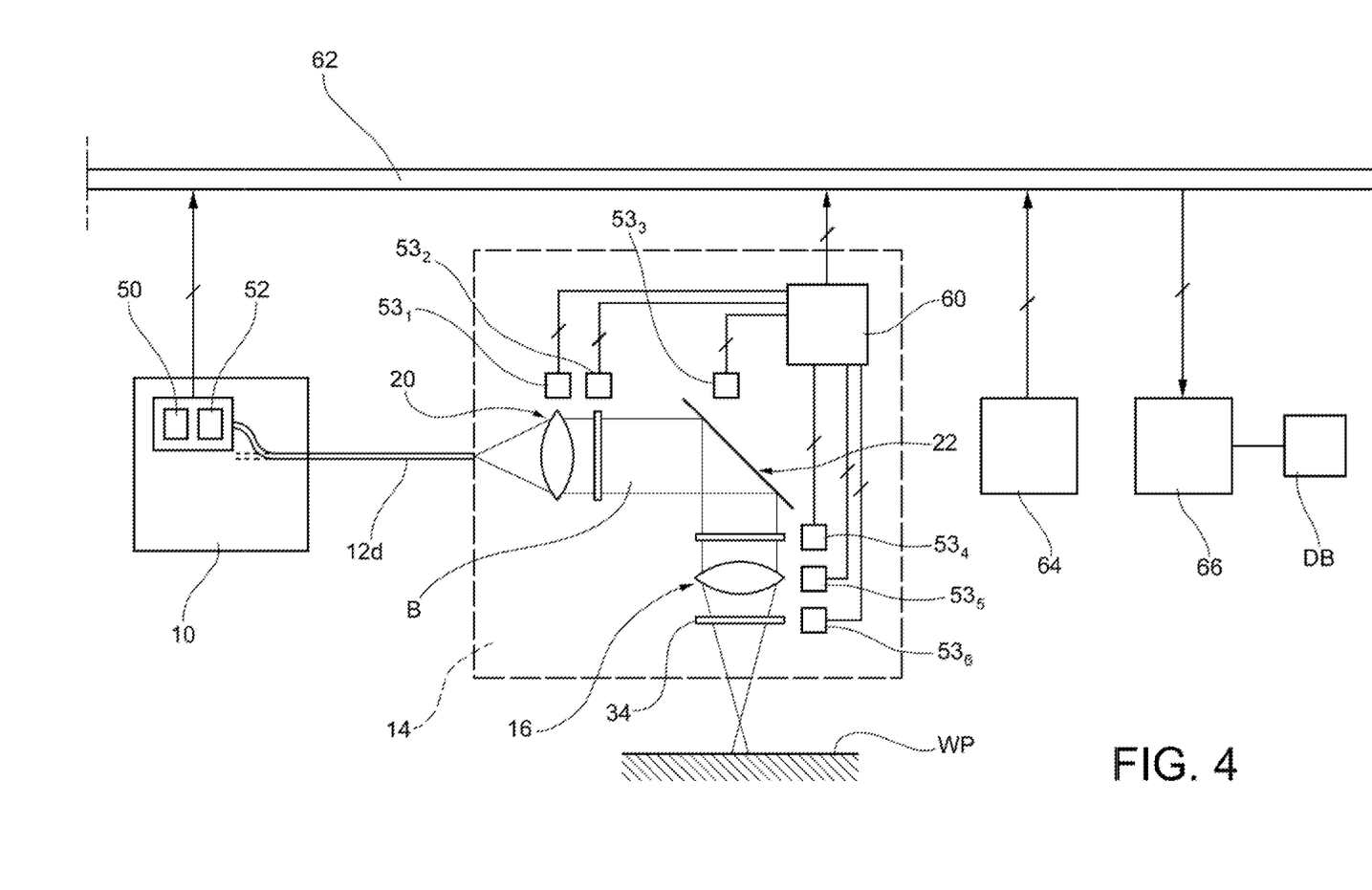
FIG. 4 schematically shows a system for detecting the operating condition of a plurality of optical elements of a processing head of a laser machine in a preferred embodiment of the invention.

A system for detecting the operating condition of a plurality of optical elements in a processing head of a laser machine is shown by way of example according to a preferred embodiment of the invention and schematized in FIG. 4. In the figure, elements or components identical or functionally equivalent to those illustrated in FIGS. 1-3 have been indicated with the same reference numerals already used in the description of said previous figures.

The system of FIG. 4 shows a laser emission source 10, adapted to emit a laser beam in a transport means, for example an optical component, including an optical fiber 12d, adapted to convey the laser beam emitted by the source towards the processing head 14 arranged in proximity to the material WP.

Coupled to the source 10 are a first coaxial laser back-reflective sensor, indicated with reference numeral 50 in the figure, and a second coaxial thermal back-emission sensor, indicated with reference numeral 52 in the figure, for example associated with an optical combiner device of the source designed to combine and launch a plurality of laser beams on the transport fiber 12d and along the same propagation direction through the processing head, the sensors being arranged at the end of a respective optical path converging on the transport fiber 12d. As an alternative to coupling with an optical combiner device, these sensors may be arranged on the back of a dichroic mirror crossed by the processing laser beam, or through any method for collecting the signal back-emitted from the optical path, which uses a collection device of such a signal positioned at the end of the transport fiber located inside the source, or in the case of several fibers connected in series, in a connection element.

At the processing head 14, in association with at least one optical element or system to be monitored belonging to the set of optical elements comprising the collimating lens 20, the beam reflecting and shaping mirror 22, the focusing lens 16 and the optical protection element 34, respective sensor arrangements are arranged, schematically indicated with reference numeral $53_1, \ldots, 53_n$ which include an infrared radiation sensor 54, a piezoelectric sensor 56 and at least one pressure sensor 58. Preferably, the aforesaid sensors are arranged in association with all the optical elements of the processing head 14, to allow complete monitoring.

Figure 5:
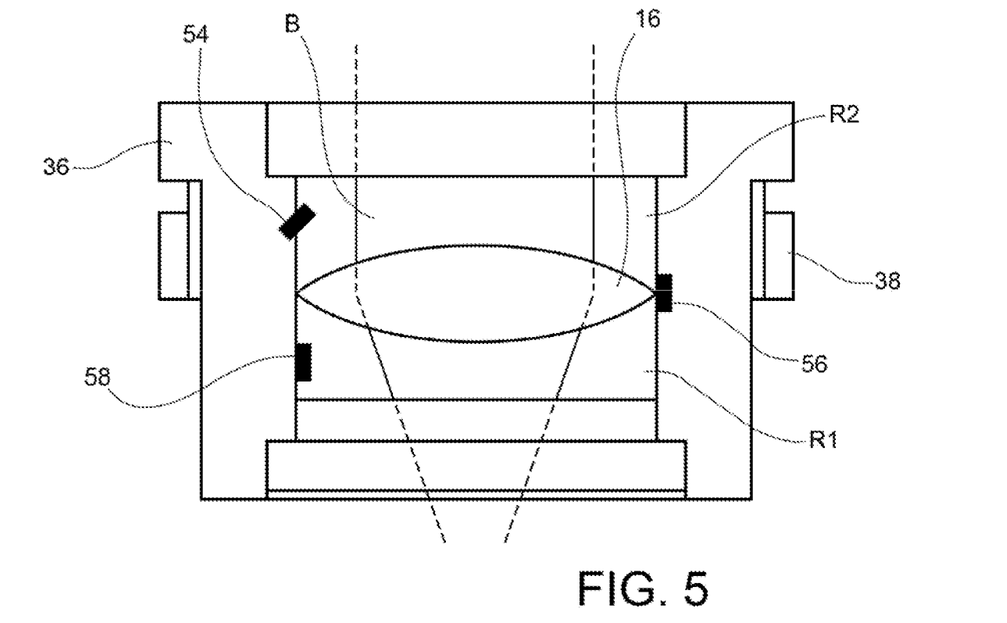
FIG. 5 schematically shows a sensor arrangement associated with an optical element for carrying out the method of the invention.

FIG. 5 shows in greater detail the arrangement of the sensors 54, 56, 58 in association with an optical element for focusing the laser beam, such as the focusing lens 16. The infrared radiation sensor 54 is arranged in a volume region R2 in proximity to the surface upstream of the optical element 16 according to the direction of propagation of the laser beam, according to an inclined orientation with respect to the plane where the element lies (i.e. with respect to the surface thereof, if flat), not in contact and with a distance sufficient, depending on the volume that receives it, to be able to intercept a diffused radiation in the volume region that the optical element faces and, preferably although not necessarily, also from the internal walls of the channel that receives the optical path. In an equivalent embodiment, a plurality of infrared radiation sensors 54 may be located in the region so as to detect in a combined manner the infrared radiation emitted by the overall surfaces and volume of the region. The piezoelectric sensor 56 is arranged in contact with an edge of the optical element itself, in such a way as to be able to detect an acoustic, in particular ultrasonic, impulse conveyed within the volume of the optical element, for example emitted by a transducer means integrated thereto, back-reflected by the edge and by the base surfaces of the element according to a diametrical or peripheral flight path. The pressure sensor 58 is arranged in a volume region to which the optical element faces, in the present embodiment, but not exclusively, the volume region downstream of the optical element. Possibly the pressure sensor 58 may be missing if it is known that the pressure in the region in which it would be arranged is the atmospheric pressure or a preset and controlled pressure. Alternatively, a pair of pressure sensors may be arranged in a first volume region R2 upstream of the optical element and in a second volume region R1 downstream of the optical element, respectively, in a volume in which the optical element is immersed.

Referring back to FIG. 4, the processing head 14 is also associated with means for collecting the signals emitted by the sensor arrangements $53_1, \ldots, 53_n$, in the form of a signal addressing unit indicated as a whole with reference numeral 60.

The first and second coaxial sensors 50 and 52, as well as the signal addressing unit 60 face a fieldbus 62, which also faces working processing and control means 64 designed to control the application of the laser beam processing along a preset processing trajectory. Controlling the application of the processing laser beam along the predetermined processing path includes controlling the delivery of an assist gas flow (in cutting applications) and controlling the irradiation of a predetermined power distribution of the laser beam towards a predetermined working area by reference to a predetermined working model or program, i.e. according to the processing trajectory information and processing parameters acquired in the form of movement instructions for the processing head and/or of the material being processed, and physical processing parameters indicative of the power distribution of the optical beam, beam power intensity and activation times of the laser beam as a function of the processing trajectory. The processing means 64 may be integrated in a single processing unit on board the machine or implemented in distributed form, therefore they comprise processing modules located in different parts of the machine, including, for example, the processing head.

The fieldbus 62 faces, in reading, processing means 66, such as for example an industrial computer, coupled to a data recording memory DB, designed to process the signals emitted by the sensors and by the working processing and control means 64, and calculating the signals or data indicative of the operating condition of the monitored optical elements.

More specifically, and for the purposes of a more detailed discussion of the method for determining the operating condition of at least one optical element, the nature of the signals emitted by the sensors and the information they provide are described below.

The coaxial laser back-reflective sensor 50 is adapted to acquire, upstream of the optical propagation path of the laser beam, and therefore upstream of one or more monitored optical elements, a signal or data, $LS_C$, indicative of an optical radiation which propagates coaxially to the optical path in a direction opposite to the direction of propagation of the laser beam, having a wavelength corresponding to the wavelength of the laser beam. It is a radiation that is back-reflected during a manufacturing process by the optical elements interposed along the propagation axis of the laser beam, that are only ideally completely transparent, for example radiation produced in the internal volume of an optical element by diffusion or micro-absorption centers, such as cracks.

The coaxial thermal back-emission sensor 52 is adapted to acquire, upstream of the optical propagation path of the laser beam, and therefore upstream of one or more monitored optical elements, a signal or data, $TS_C$, indicative of an optical radiation which propagates coaxially to the optical path in a direction opposite to the direction of propagation of the laser beam, having a wavelength in the near infrared range, and preferably greater than 1.2 µm. This is radiation emitted during a manufacturing process by the surfaces of the optical elements interposed along the propagation axis of the laser beam in the so-called "thermal band" or thermal infrared band, due to the energy of the processing laser beam crossing them.

The infrared radiation sensor means 54 are adapted to acquire a volume signal or data, $IR_V$, indicative of a proximity optical radiation emitted by the optical element with which it is associated, outside the propagation axis of the laser beam, at a wavelength comprised in the infrared spectral range, in the first volume region R2 in proximity to the surface of the optical element facing upstream with respect to the optical path of the processing laser beam. Such optical radiation is for example the radiation due to thermal effects, that is emitted by the optical element and diffused in the first volume region R2 by the volume walls. Not only is this radiation emitted as a consequence of the application of the laser beam, conveying information on the degree of cleanliness of the optical element, but also when the laser beam is turned off, substantially conveying an "ambient temperature indication" of the optical element.

The piezoelectric sensor 56 is adapted to acquire a signal or data, PS, which is a function of the time-of-flight of an acoustic, in particular ultrasonic, wave launched through the volume of the optical element, said time-of-flight time being dependent on the state of integrity of the volume of the optical element and the temperature of the element, which in turn depends on the power distribution of the processing laser beam incident through the optical element and on the impurities (dirt, surface blackening) of the element. Specifically, the piezoelectric sensor 56 is adapted to detect the speed of the ultrasonic acoustic wave.

The pressure sensor 58 is adapted to acquire a signal or data indicative of the pressure, p, of the gas permeating the volume of the region to which at least one surface of the optical element faces, for example a gas pressure in the region downstream of an optical protective element which acts as a seal of a chamber of an assist gas nozzle in a cutting process. The signal or data indicative of the pressure may also be a differential signal or data, indicative of the pressure difference between the upstream region and the downstream region of the element, if the pressure in the neighboring region without sensor is known or predetermined. In the alternative embodiment in which a pair of pressure sensors is provided, in the first volume region R2 upstream of the optical element and in the second volume region R1 downstream of the optical element, respectively, in a volume of the processing head in which the optical element is immersed, the signal addressing unit 60 or the processing means 66 are adapted to calculate the pressure difference between the upstream region and the downstream region of the element.

The working processing and control means 64 are arranged to supply in real time signals or data indicative of parameters of the working process in progress, which include at least and necessarily, and with reference to a single optical element:

the optical power, P, controlled by the processing laser beam;

the nominal pressure of the gas supplied in a region to which the optical element faces or in the region in which the optical element is immersed, for example the assist gas, controlled by a proportional valve for regulating the aforementioned pressure, indicated below with $p_{nom}$ (in the case in which the optical element is immersed in atmospheric pressure, the nominal pressure may be given as known and is not measured);

a code, $ID_{tool}$, adapted to uniquely identify the processing tool used and therefore a set of working parameters controlled in the process, such as the standoff distance of the cutting nozzle from the material being processed, where this is important, the axial position of the focusing spot of the laser beam, the angle of incidence of the laser beam with respect to the perpendicular to the surface of the material in the current processing area; and the relative movement speed of the mutual position between the processing head and the material in a working operating condition, indicated by $v_{feed}$.

The working processing and control means 64 are further arranged to supply in real time signals or data indicative of the production in progress and the piece of material being processed, which include at least and necessarily, and with reference to a single optical element:

a code, $ID_{mat}$, identifying the material being processed and its surface state, in particular the surface roughness;

the thickness of the material being processed, indicated with Th; and the processing step, indicated with Ph(n), which represents a specification of the time phase of the tool identified with $ID_{tool}$, for example in the case of cutting, the distinction between breakthrough drilling, cutting approach segment, cutting on rectilinear trajectory and locally flat surface, cutting on a non-flat surface, cutting not orthogonal to the surface, in the case of the breakthrough drilling, one of the sub-steps into which the same drilling may be divided, modifying for example the standoff height, or the focus position, or power, or in the case of cutting on a straight trajectory and locally flat surface, the sub-steps of acceleration start and cruise at constant speed.

Figure 6:
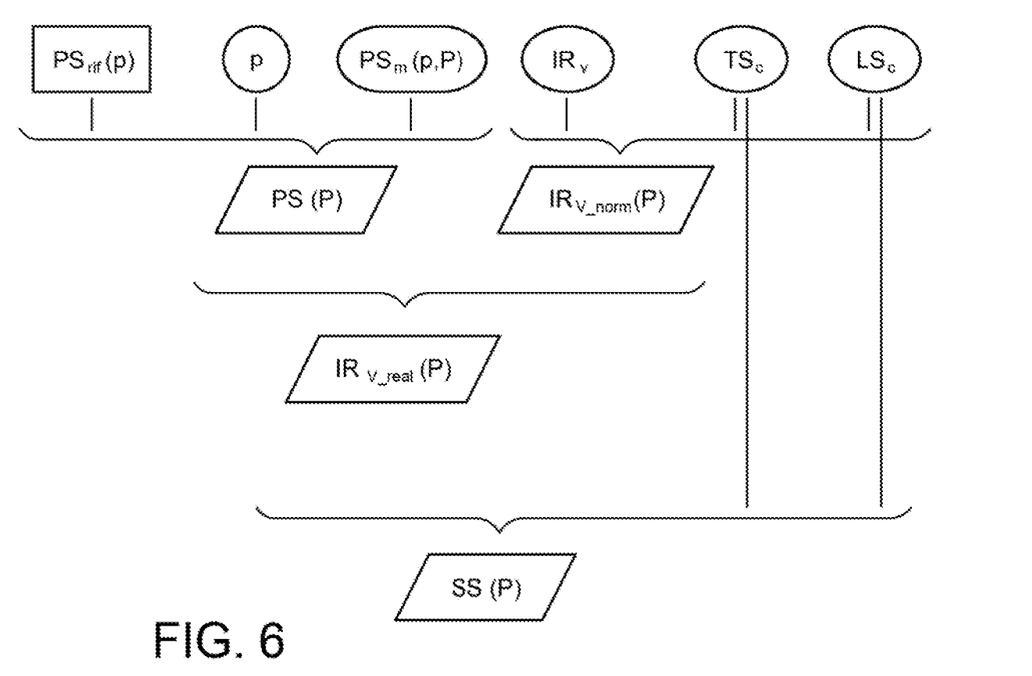
FIGS. 6 and 7 are schematic representations of the relationships between the quantities measured or calculated in carrying out the method of the invention.
Figure 7:
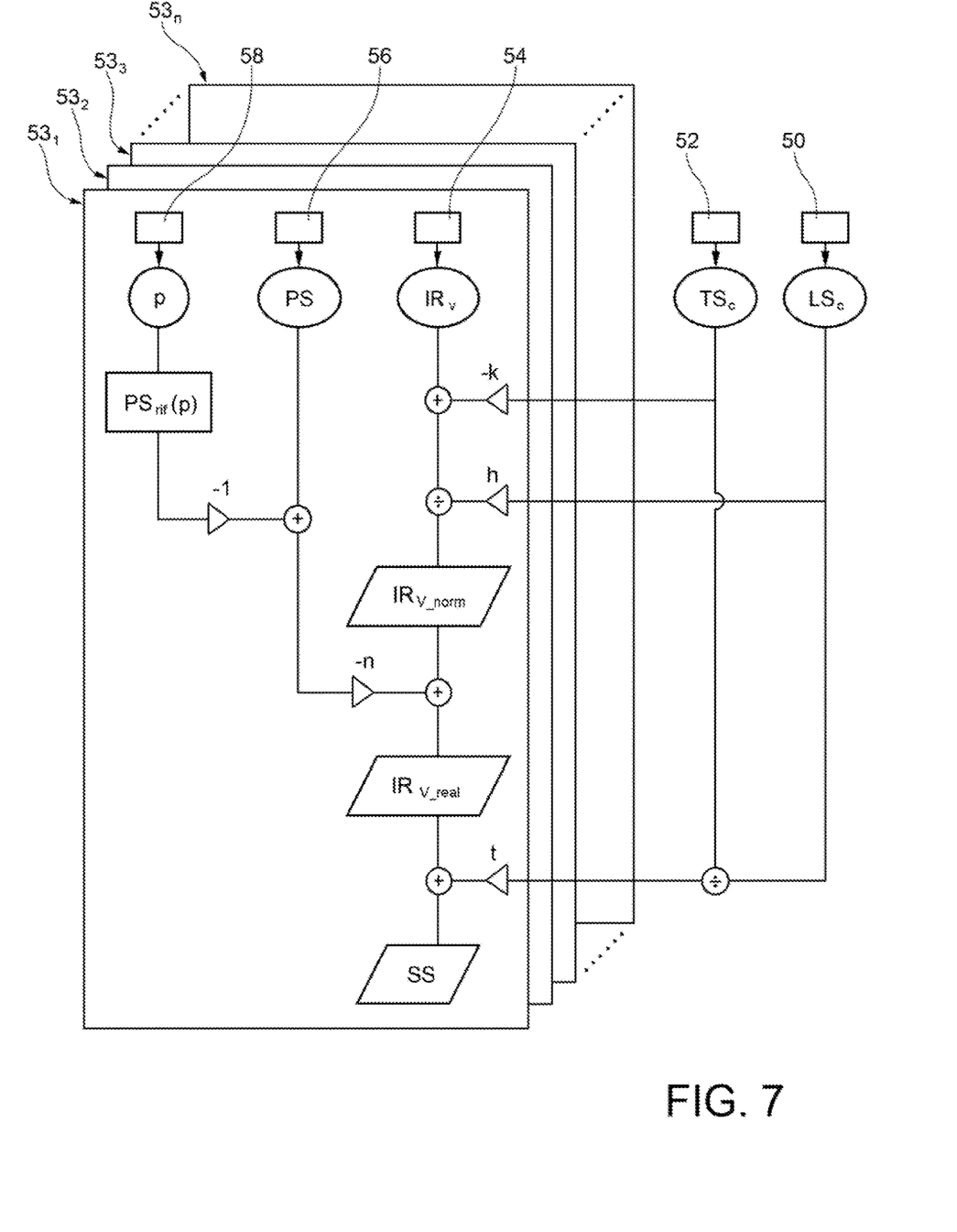
Figure 8:
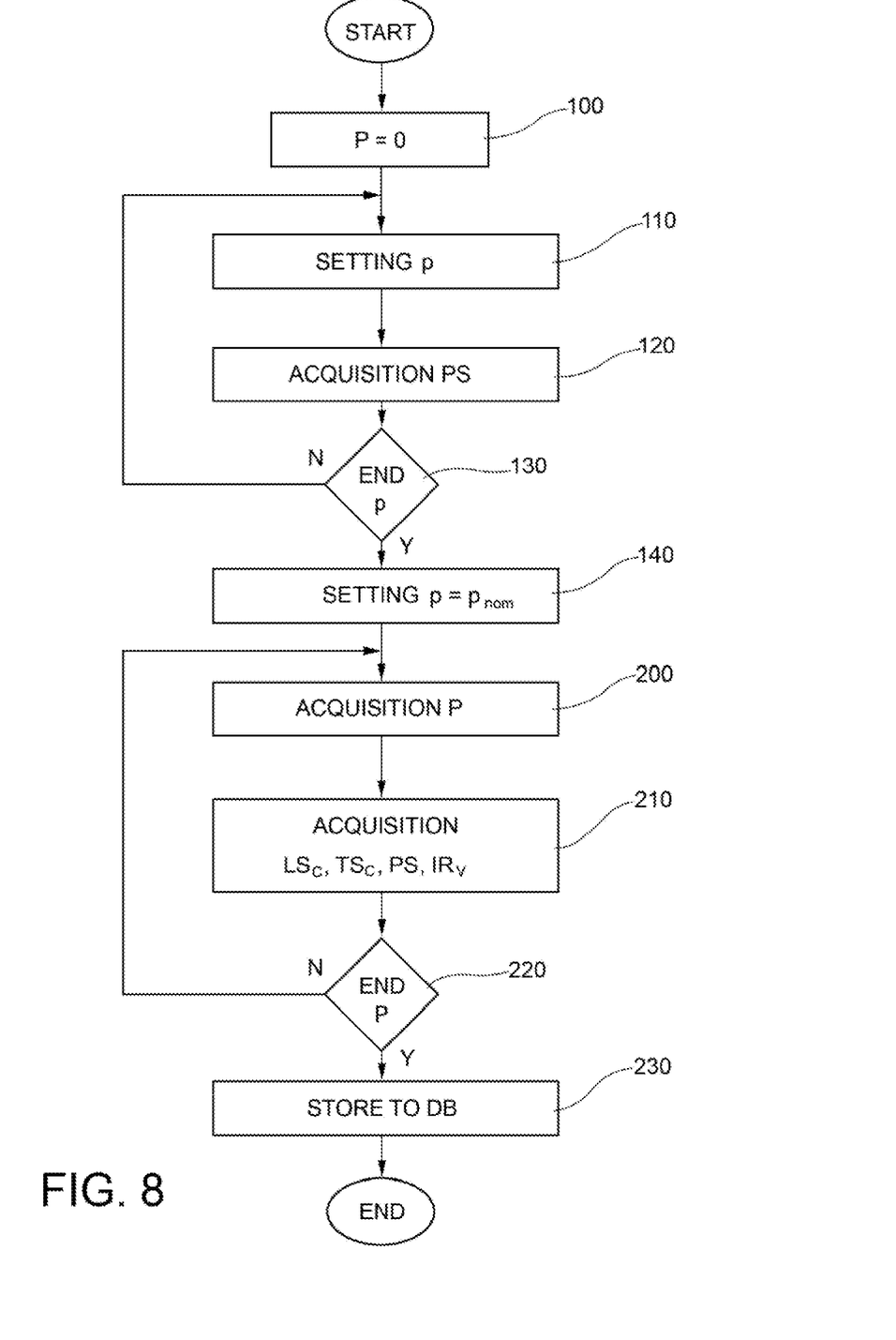
FIG. 8 is a flow diagram of the operations carried out for establishing a reference database of the operating conditions of an optical system of a processing head of a laser machine, according to the method of the invention.

With reference to FIGS. 6, 7 and 8, the method for detecting the operating condition of at least one optical element, implemented by the processing means 66 according to a currently preferred embodiment of the present invention, is described. FIGS. 6 and 7 are schematic representations of the relationships between the quantities measured or calculated in carrying out the method of the invention, in terms of signal dependence and signal processing flow, respectively, where the quantities indicated in the oval boxes are measured quantities, the quantities indicated in the rectangular boxes are table quantities and the quantities indicated in the parallelogram boxes are calculated quantities. FIG. 6 shows the relationships between measured or calculated quantities relative to a generic optical element, while FIG. 7 clearly expresses that the aforementioned relationships are repeated for a plurality of optical elements, represented by parallel planes on which the logical/mathematical relationships are developed. The flow chart of FIG. 8 is a synthetic high-level presentation of the operations carried out for the establishment of a reference database of the operating conditions of the optical system of a processing head, used as a term of comparison with the current operating conditions of the optical system. Preferably, the reference database is obtained by applying the method on a set of specially designed samples of known materials.

In general, the method includes two steps. In a first step, the response of the sensors is acquired and processed in an operating "unladen" condition, in which the laser source is active and the power laser beam propagates through the optical path in the processing head of the machine, in the absence of the material being processed. In a second step, the response of the sensors is acquired and processed in a working operating condition, in which said power laser beam impinges on a material processing area. To ensure real-time control during the making of a workpiece, i.e. during the working operating condition, the two steps must be carried out in the order indicated, i.e. first in an unladen operating condition and then in a working operating condition, when the data acquired in the unladen operating condition are available in table form.

In the case of a cutting working process, the emission of an assist gas flow, which in the working operating condition is directed towards the processing area of the material, is enabled both in the unladen operating condition and in the working operating condition.

The signal or data indicative of the operating condition of at least one optical element, which constitutes a synthetic parameter indicative of the quality of the optical element during a manufacturing process, is obtained starting from the processing values of the sensor responses during the processing of the material, and the processing values of the sensor responses in the unladen operating condition.

Sensor responses may be logged and stored for later processing or processed in real time.

Preferably, an initial calibration step is carried out at the installation of an optical path (for example, at the installation of a new processing head of the machine or at the replacement of an optical element therein), in which the signal or data indicative of the operating condition of an optical element is representative of an ideal condition of the optical element, and a scheduled check cycle is carried out in an unladen operating condition, for example with scheduled regularity when production from the machine is stopped, and in a working operating condition, in which the signal or data indicative of the operating condition of the optical element is representative of a current condition of the optical element during the material processing.

Conveniently, the verification cycle is regulated by the production rate, and offered as a free choice to an operator, for example at each geometry change, or between one workpiece to be produced and the other, or at the change of the raw material, be it tube or sheet metal or other, or at the change of a production batch. A time interval may also be provided, in which case the machine chooses the first one among the different verification deadlines.

In further more specific terms, in the unladen operating condition the following operations are carried out, in the described sequence or in other possible sequences, in relation to the signals or data of the coaxial sensors 50, 52 representative of the complete optical path and in relation to the signals or data of the volume radiation 54, piezoelectric 56 and pressure 58 sensors, representative of the individual optical components. In the formulas below, the subscript notation "0" indicates the unladen operating condition.

A correlation curve is calibrated between the power of the laser beam, P, which the working processing and control means require from the laser emission source, and the signal $LS_C$ detected by the laser back-reflective sensor 50. The correlation curve is obtained by controlling the power of the laser beam, P, between a predetermined minimum and maximum according to a power ramp. The correlation curve is defined as $$LS_C(P)_0 = f(P) \tag{1}$$

and is stored in the memory DB of the processing means 66.

By comparison, if subsequent measurements, in unladen operating conditions or in working conditions, provide a different reading, typically higher, they indicate that there is greater back-reflection or diffusion by the optical path, signaling a state of general wear of the path itself. A threshold comparison allows the detected signal to be associated with a general indicator of the state of the optical chain. However, if a wear problem is reported, it is important to know which optical element or group of optical elements are affected.

Likewise, a correlation curve is calibrated between the power of the laser beam, P, which the working processing and control means require from the laser emission source, and the signal $TS_C$ detected by the thermal back-emission sensor 52. The correlation curve is obtained by controlling the power of the laser beam, P, between a predetermined minimum and maximum according to a power ramp. The correlation curve is defined as $$TS_C(P)_0 = f(P) \tag{2}$$

and is stored in the memory DB of the processing means 66.

Being in an operating "unladen" condition, it is assumed that all the thermal radiation collected is produced by the optical system itself, due to the heating of the optical elements. Even the $TS_C$ signal, by its nature, may only give overall information because the thermal radiation emitted by the optical elements is integrated along the entire optical path downstream of the sensor, which in the case in which it is integrated in an optical combiner device or in an equivalent connection element of several fibers connected in series or in a collection device positioned at the end of the transport fiber inside the source, arranged upstream of the path of the laser beam, is the entire optical path in the processing head.

The laser back-reflection and thermal back-emission signals are stored to serve as a basis of comparison for subsequent unladen measurements.

A further signal that is analyzed is the volume signal or data, $IR_V$, indicative of a proximity optical radiation emitted by the optical element with which it is associated at a wavelength within the infrared spectral range, in the volume region in proximity to the surface of the optical element facing upstream with respect to the optical path of the processing laser beam.

Such proximity radiation informs about the optical element towards which the sensor is pointing, and in particular its surface, and informs about the optical elements in the immediate vicinity thereof, through the collection of signals arriving at the sensor through multiple reflections. Also in this case, a correlation curve is calibrated between the power of the laser beam, P, which the working processing and control means require from the laser emission source, and the signal $IR_V$ detected by the infrared radiation sensor 54. The correlation curve is obtained by controlling the power of the laser beam, P, between a predetermined minimum and maximum according to a power ramp. The correlation curve is defined as $$IR_V(P)_0 = f(P) \quad (3)$$

and is stored in the memory DB of the processing means 66.

This curve suffers from inaccuracies resulting from the fact that the sensor "sees" too much information overlaid. In order to overcome the limit of superimposition of information, and to obtain exclusive information referring only to the optical element directly observed by the sensor 54, the signal $IR_V$ is normalized by subtracting the rescaled values of $TS_C$ and dividing the result by rescaled values of $LS_C$ according to the relationship $$IR_{V\_norm}(P)_0 = (IR_V(P)_0 - k*TS_C(P)_0)/(h*LS_C(P)_0) \quad (4)$$

with appropriate k and h.

The values of $TS_C$ and $LS_C$ are rescaled for normalization purposes in order to take into account possible different detection scales of the signals $TS_C$ and $LS_C$ and $IR_V$, variations in the optical coupling of the back-reflected radiation or spurious signal components from other optical fibers. Advantageously, the values of k and h are selected in such a way that, during an initial "factory" characterization step of the optical path, the aforementioned correlation curve is unique and universal for the same configuration of the "head model," regardless of the signal variations of the single specimens, starting from a condition of cleanliness of the optical elements which is considered the maximum standardizable in a clean room.

In this way, a signal is obtained which is much more correlated to the state of wear and cleanliness of the nearest optical element, since the information relating to the rest of the optical path has been measured independently and minimized.

The signal thus obtained, however, is not completely informative, because it is mainly generated by the emission of the surface of the optical element under analysis.

A further independent measurement is desirable which directly informs about the stress and surface tension state of the optical element. This measurement may be obtained through the signal of the piezoelectric transducer 56.

From the analysis of the signal PS which is a function of the time-of-flight of an acoustic wave through the volume of the optical element, it is possible to obtain information that derives from the sum of the effects of temperature and mechanical stress in the volume of the element, and of the surface tension of the element itself.

Advantageously, the influence of the tension generated by the gas pressure on the surface of the optical element is canceled, in the unladen step, by collecting the curve that correlates the time-of-flight of the signal PS of the piezoelectric sensor with the pressure, and varying it, with a laser source off. The pressure value is the one read by the pressure sensor 58 which is immersed in the same volume of interest for the measurement, therefore it is a direct measurement which is compared with the pressure actually regulated by the proportional valve. Then, again in the unladen step, a matrix of dependence values of the time-of-flight signal PS on the power P of the incident laser and on the pressure p is collected.

In formulas, $$p(p_{nom})_0 = f(p_{nom})$$

$$PS_{ref}(p)_0 = f(p) \quad (5)$$

$$PS_m(p,P)_0 = PS_{ref}(p)_0 + f(P)_0 \quad (6)$$

$$PS(P)_0 = PS_m(p,P)_0 - PS_{ref}(p)_0 \quad (7)$$

where the signal or data PS(P) as a function of the time-of-flight of an acoustic wave through the volume of said optical element is a signal or data indicative of the contribution of the power of the laser beam to the time-of-flight of said acoustic wave, and is calculated by difference between (i) a measurable time-of-flight signal or data, $PS_m(p, P)$, which is indicative of the joint contribution to the time-of-flight of said acoustic wave by the power of the laser beam and the pressure of a gas present in a predefined volume region to which the optical element faces, or of the pressure difference between a region upstream of the optical element and a region downstream of the optical element in a volume in which the optical element is immersed, and (ii) a reference time-of-flight signal or data, $PS_{ref}(p)$, indicative of the contribution to the time-of-flight of said acoustic wave by the pressure of the gas present in the volume region at which the optical element faces, or of the difference of pressure between a region upstream of the optical element and a region downstream of the optical element in a volume in which the optical element is immersed, the reference time-of-flight signal or data, $PS_{ref}(p)$, being predetermined starting from the acquisition of a signal or data indicative of the current pressure p of the gas present in the volume region to which the optical element faces, or of the pressure difference between a region upstream of the optical element and a region downstream of the optical element in a volume in which the optical element is immersed, on the basis of a model of relationship between gas pressure and time-of-flight of the acoustic wave through the volume of the optical element in a preliminary calibration step conducted in the absence of the laser beam.

The acquisition of a signal or data indicative of the current pressure p of the gas present in the volume region to which the optical element faces may take place through the pressure sensor 58 or by effect of the communication from the working processing and control means 64 to the processing means 66 of a preset and controlled pressure value. The acquisition of a signal or data indicative of the difference in pressure between a region upstream of the optical element and a region downstream of the optical element in a volume in which the optical element is immersed occurs similarly through a pair of pressure sensors 58, by effect of the communication from the working processing and control means 64 to the processing means 66 of preset and controlled pressure values, or through a combination of the two methods if only one sensor is provided in a region and the pressure in the other region is known as it is preset and controlled.

The correlation curve defined as $$PS(P)_0 = PS_m(p,P)_0 - PS_{ref}(p)_0$$

is stored in the memory DB of the processing means 66.

The role of the piezoelectric sensor is therefore not to indirectly acquire temperature information, but to acquire a convoluted signal of temperature and surface stress induced by the pressure applied to only one face of the optical element under control, and the signal PS has no informative purposes of the process but corrective purposes, in particular corrective purposes of the information conveyed by the signal $IR_{V\_norm}$. With the direct measurement of the pressure through the pressure sensor in the unladen condition, the effect of pressure is parameterized, and the indirect measurement of temperature and pressure obtained by the piezoelectric sensor is used as a corrective parameter of the signal detected by the infrared radiation sensor associated with the optical element under control.

Taking into account the previous formulas, it is possible to have local information on wear and internal stress of the specific optical element, isolated from the effects due to the gas pressure, and which allows obtaining from the general information, in cascade, the collective information on the other optical elements, according to the formulas $$IR_{V\_real}(P)_0 = m*IR_{V\_norm}(P)_0 - n*PS(P)_0 \quad (8)$$

with appropriate m and n, and $$SS(P)_0 = t*(TS_C(P)_0/LS_C(P)_0) + s*IR_{V\_real}(P)_0 \quad (9)$$

with appropriate t and s, where $SS_0$ represents the operating condition of the optical element in an unladen operating condition.

The values of m, n, t and s are selected in such a way that, during an initial "factory" characterization step of the optical path, the aforementioned correlation curves are unique and universal for the same configuration of the "head model", regardless of the signal variations of the single specimens, starting from a condition of cleanliness of the optical elements which is considered the maximum standardizable in a clean room. The foregoing allows acquiring and storing nine signal curves or reference data, relating to the specific contingent state of the optical path and relating to the specific contingent state of the element subject to the single measurement, i.e. referred to a specific processing head subjected to factory calibration with clean optical elements. Advantageously, a database of reference signals or data is constructed, obtained with laser beam and assist gas present, but without interaction with the material.

The flow chart of FIG. 8 is a synthetic high-level presentation of the operations carried out for the establishment of a reference database of the operating conditions of the optical system of a processing head, stored in the memory DB of the processing means 66, according to the above description, which is advantageously carried out for a plurality of different specific process contexts, identified on the basis of the parameters of the manufacturing process and of the parameters indicative of the production and of the workpiece of material being processed, in an unladen operating condition and in a working processing condition on material samples.

Specifically, 100 indicates a step of setting the power of the processing laser beam to zero, 110 indicates a step of setting the pressure in the region to which the optical element faces or in the region in which the optical element is immersed and 120 indicates an acquisition step of the signal PS of the piezoelectric sensor as a function of the set pressure. The set pressure is varied in a predetermined range of pressures starting from the value of 1 bar up to the value of 25 nominal bars in discrete steps, checking at step 130 whether the final pressure setting of the predetermined range of pressures has been reached, in which case the process moves to the next step 140 of setting the pressure, in the region to which the optical element faces or in the region in which the optical element is immersed, at a predetermined constant nominal value, intermediate to the range of possible pressures, for example a value of 5 bar. Subsequently, in step 200 the power of the processing laser beam is set, and 210 indicates an acquisition step of the signals $LS_C$, $TS_C$, PS, $IR_V$ as a function of the optical power set. The set optical power is varied in a predetermined range of optical powers starting from zero up to the nominal power of the laser source, typically from 1 to 20 kW, in discrete steps, checking in step 220 whether the final optical power setting of the predetermined range of powers has been reached, in which case the process moves to the subsequent step 230 for storing the measured values of $LS_C$, $TS_C$, PS, $IR_V$ in the database stored in the memory DB of the processing means 66.

In the working operating condition the following operations are carried out, in the described sequence or in other possible sequences, in relation to the signals or data of the coaxial sensors 50, 52 representative of the complete optical path and in relation to the signals or data of the volume radiation 54, piezoelectric 56 and pressure 58 sensors, representative of the individual optical components.

In particular, the same signals detected in the unladen step are detected, but in this case they are a function of the production in progress and of the workpiece of material being processed as well as of the parameters of the working process in progress, listed above, i.e. the processing tool used, the nominal pressure of the assist gas controlled by a proportional control valve, the relative movement speed of the mutual position between the processing head and the material, the material being processed and its thickness, the processing step.

The operating condition of at least one optical element, i.e. the "quantity" of wear and stress on a specific element, is therefore represented by the formula $$IR_{V\_real}(P, v_{feed}, ID_{mat}) = a*IR_{V\_norm}(P, v_{feed}, ID_{mat}) - b*PS(P) \quad (10)$$

with appropriate a and b, referring to a corresponding test condition of the process carried out preliminarily to collect reference data, which represents the variant of formula (8) in the working operating condition, where $$IR_{V\_norm}(P, v_{feed}, ID_{mat}) = IR_V(P) + (k(v_{feed}, ID_{mat}, Th)*TS_C(P)/(h(v_{feed}, ID_{mat}, Th)*LS_C(P))) \quad (10a)$$

with k and h representing linear functions of the relative movement speed of the mutual position between the processing head and the material and of the material thickness, dependent on the material according to a reflectivity scale, and $$PS(P) = PS_m(p,P) - PS_{ref}(p) \quad (10b)$$

considering only the volumetric stress contribution induced by the thermal component (non-linear thermal expansions) and not the surface tension contribution induced by the gas pressure.

Similarly to that calculated in the unladen operating condition, the processing means 66 calculate the operating condition of the optical element SS during the process according to the formula $$SS(P)=t^*(TS_C(P)/LS_C(P))+s^*IR_{V\_real}(P) \quad (11)$$

The processing means 66 compares the signals or data detected or calculated in working operating conditions or the signals or data acquired or calculated in unladen operating conditions—generally referred to as signals or data indicative of the operating condition of said optical element in a current condition—with the acquired or calculated reference signals or data for a similar process context, and emits an anomaly signal when the signal or data indicative of the current operating condition of the optical element, SS, differs from the signal or data indicative of the operating condition of said optical element in a reference (or ideal) condition for a value higher than a first predetermined threshold.

Alternatively, or in addition to the foregoing, the processing means 66 compares the signals or data detected or calculated in working operating conditions with the signals or data acquired or calculated in unladen operating conditions (for example, the most recent unladen operating condition) for a similar process context, and emits an anomaly signal when the signal or data indicative of the operating condition of the optical element, SS, in a working operating condition differs from the signal or data indicative of the operating condition of said optical element in an unladen operating condition for a value higher than a predetermined second threshold.

Still alternatively, or in addition to the foregoing, the processing means 66 compares the signals or data detected or calculated in working operating conditions, or the signals or data acquired or calculated in unladen operating conditions, to a verification cycle n—indicated generally as signals or data indicative of the operating condition of said optical element in a current verification cycle—with the signals or data detected or calculated in working operating conditions, respectively the signals or data acquired or calculated in unladen operating conditions, for a verification cycle n−1 or in any case preceding—generically indicated as signals or data indicative of the operating condition of said optical element in a previous verification cycle—for a similar process context, and emits an anomaly signal when the signal or data indicative of the current operating condition of the optical element, SS, differs from the signal or data indicative of the previous operating condition of said optical element for a value higher than a predetermined third threshold.

The analogous process context is determined on the basis of the parameters of the working process in progress and the parameters indicative of the production in progress and of the workpiece of material being processed, provided by the working processing and control means 64. Advantageously, said threshold is predetermined as a function of process context information which includes the parameters of the working process in progress and the parameters indicative of the production in progress and of the workpiece of material being processed.

Such a comparison may be carried out separately for each signal or partial data, $LS_C$, $TS_C$, $IR_V$, $IR_{V\_norm}$, $IR_{V\_real}$, although for some of them, in particular the back-reflection signals or data $LS_C$ and back-emission signals or data $TS_C$, it is preferable to apply a threshold control indicative of an unexpected or non-optimal operating condition, by comparison with calibrated values in standard cases.

In particular, the synthetic parameters $IR_{V\_real}$ and SS allow obtaining information on the state of the entire optical path, and of a specific component once the specific sensor arrangement described above has been associated with it, both in an unladen operating step, in the absence of material, and in a working operating step, during a process of laser cutting, drilling, welding of the material.

Advantageously, during the process, reaching the alarm threshold of a synthetic parameter causes a stop of the machine and a subsequent unladen check. In this way, it is possible to acquire both information about anomalies during processing and information on the wear trend of the optical elements.

Advantageously, the method of the invention allows acquiring information on the state of a plurality of optical elements packaged in a narrow volume, such as typically a movable processing head of a machine for processing materials using high-power laser beams (higher than 700 W), whose back-emissions and back-reflections of optical radiation interfere with each other, and separate the contributions of different optical elements otherwise superimposed along the optical propagation path of the laser beam. This is done by separately identifying the operating conditions of the optical elements in a working operating condition, with respect to the operating conditions of the optical elements in an unladen operating condition, which allows isolating the contributions to persistent operating conditions, determined by impurities or wear, from contributions to temporary operating conditions, caused by the propagation of the high-power laser beam.

Even more advantageously, the arrangement of the method of the invention allows separating the contributions of mere back-reflection of the processing laser beam from the contributions deriving from diffusion of the laser beam caused by unwanted surface impurities of the optical elements or from cracks of the optical elements deriving from stress/strain, for example caused by intolerable conditions of temperature or operating pressures, and further separate the contributions of a thermal nature from those deriving from pressure stresses.

It should be noted that the embodiment proposed for the present invention in the preceding discussion is purely by way of non-limiting example of the present invention. A person skilled in the art will easily be able to implement the present invention in different embodiments which do not however depart from the principles set forth herein, and are therefore encompassed in the present patent.

This is particularly true with regard to the possibility of implementing the method by means of a trained neural network starting from the known signals or data described.

Naturally, without prejudice to the principle of the invention, the embodiments and the details of construction may be widely varied with respect to that which has been described and illustrated purely by way of non-limiting example, without thereby departing from the scope of protection of the invention defined by the appended claims.

The invention claimed is:

1. A method for detecting an operating condition of at least one optical element arranged along an optical propagation path of a power laser beam in a processing head of a machine for laser processing of a material, in particular for laser cutting, drilling or welding said material, wherein said power laser beam has a predetermined transverse power distribution at a predetermined operative wavelength, and said optical propagation path of the power laser beam within said processing head comprises a plurality of cascaded optical elements, the method comprising the steps of:
a) acquiring, upstream of said at least one optical element, a first signal or data, $LS_C$, indicative of a detected first optical radiation which propagates coaxially to the optical propagation path in a direction opposite to the direction of propagation of the power laser beam, having a wavelength corresponding to the wavelength of the power laser beam;
b) acquiring, upstream of said at least one optical element, a second signal or data, $TS_C$, indicative of a detected second optical radiation which propagates coaxially to the optical propagation path in a direction opposite to the direction of propagation of the power laser beam, having a wavelength in near infrared range;
c) acquiring a third signal or data, $IR_V$, indicative of a detected proximity optical radiation emitted by said at least one optical element at a wavelength in infrared range in a first volume region in proximity to an upstream surface of the at least one optical element with respect to said optical propagation path;
d) acquiring a fourth signal or data, PS, which is a function of time-of-flight of an acoustic wave launched through the volume of said at least one optical element;
e) calculating a normalized signal or data of proximity optical radiation, $IR_{V\_norm}$, for said at least one optical element, as a function of the third signal or data, $IR_V$, indicative of the proximity optical radiation emitted by said at least one optical element, of the second signal or data, $TS_C$, indicative of the second optical radiation, and of the first signal or data, $LS_C$, indicative of the first optical radiation;
f) calculating a signal or data of real proximity optical radiation, $IR_{V\_real}$, for said at least one optical element, as a function of the normalized signal or data of proximity optical radiation, $IR_{V\_norm}$, and of the fourth signal or data PS that is a function of the time-of-flight of the acoustic wave launched through the volume of said at least one optical element; and
g) calculating a signal or data indicative of the operating condition, SS, of said at least one optical element, as a function of the signal or data of real proximity optical radiation, $IR_{V\_real}$, of the second signal or data, $TS_C$, indicative of the second optical radiation, and of the first signal or data, $LS_C$, indicative of the first optical radiation.

2. The method according to claim 1, wherein calculating the normalized signal or data of proximity optical radiation, $IR_{V\_norm}$, for said at least one optical element comprises calculating a ratio between the difference between the third signal or data, $IR_V$, indicative of the proximity optical radiation emitted by said at least one optical element, and a signal or data proportional to the second signal or data $TS_C$, indicative of the second optical radiation, and a signal or data proportional to the first signal or data, $LS_C$, indicative of the first optical radiation, according to the following expression:

$$IR_{V\_norm}=(IR_V-k*TS_C)/(h*LS_C).$$

3. The method according to claim 1, wherein calculating the signal or data of real proximity optical radiation, $IR_{V\_real}$, for said at least one optical element comprises calculating a difference between a signal or data proportional to the normalized signal or data of proximity optical radiation, $IR_{V\_norm}$, and a signal or data proportional to the fourth signal or data PS that is a function of the time-of-flight of the acoustic wave launched through the volume of said optical element, according to the following expression:

$$IR_{V\_real}=m*IR_{V\_norm}-n*PS.$$

4. The method according to claim 1, wherein calculating the signal or data indicative of the operating condition of said at least one optical element, comprises calculating a sum of a signal or data proportional to the signal or data of real proximity optical radiation, $IR_{V\_real}$, and a signal or data proportional to the ratio between the second signal or data $TS_C$, indicative of the second optical radiation, and the first signal or data $LS_C$, indicative of the first optical radiation, according to the following expression:

$$SS=t*(TS_C/LS_C)+S*IR_{V\_real}.$$

5. The method according to claim 1, wherein the fourth signal or data that is a function of the time-of-flight of the acoustic wave launched through the volume of said at least one optical element PS(P), is a signal or data indicative of a contribution of power of the power laser beam to the time-of-flight of said acoustic wave, and is calculated by difference between
a signal or data of a measurable time-of-flight, $PS_m(p, P)$, which is indicative of a joint contribution to the time-of-flight of said acoustic wave from power of the power laser beam and pressure of a gas present in a volume region to which the at least one optical element faces, or pressure difference between the first volume region upstream of the at least one optical element and a second volume region downstream of the at least one optical element in a volume in which the at least one optical element is immersed, and
a reference time-of-flight signal or data, $PS_{rif}(p)$, indicative of the contribution to the time-of-flight of said acoustic wave from the pressure of the gas present in the volume region to which the at least one optical element faces, or pressure difference between the first volume region upstream of the at least one optical element and the second volume region downstream of the at least one optical element in a volume in which the at least one optical element is immersed,
said reference time-of-flight signal or data, $PS_{rif}(p)$, being predetermined from acquisition of a signal or data indicative of a current pressure of the gas present in the volume region to which the at least one optical element faces or the pressure difference between the first volume region upstream of the at least one optical element and the second volume region downstream of the at least one optical element in a volume in which the at least one optical element is immersed, on the basis of a relationship model between gas pressure and time-of-flight of the acoustic wave launched through the volume of the at least one optical element in a preliminary calibration phase carried out in absence of the power laser beam.

6. The method according to claim 1, further comprising carrying out steps a) to g) in an unladen operating condition, in which said power laser beam is emitted in absence of the material to be processed, and in a working operating condition, in which said power laser beam impinges on a processing area of the material with presence of an assist gas flow delivered towards said processing area of the material.

7. The method according to claim 6, wherein said unladen operating condition comprises delivery of the assist gas flow.

8. The method according to claim 1, wherein said first, second, third and fourth signals or data are dependent upon the power of the power laser beam in the unladen operating condition, and are furthermore dependent upon the material and relative movement speed of mutual position between the processing head and said material in the working operating condition.

9. The method according to claim 1, further comprising carrying out an initial calibration step at installation of said optical propagation path, whereby said signal or data indicative of the operating condition of said at least one optical element is representative of an ideal condition of the at least one optical element, and carrying out a programmed test cycle in the unladen operating condition and in the working operating condition, whereby said signal or data indicative of the operating condition of said at least one optical element is representative of a current condition of the at least one optical element.

10. The method according to claim 9, further comprising issuing an anomaly signal when the signal or data indicative of the operating condition of said at least one optical element in the current condition differs from the signal or data indicative of the operating condition of said at least one optical element in a reference condition for a value greater than a predetermined first threshold.

11. The method according to claim 9, further comprising issuing an anomaly signal when the signal or data indicative of the operating condition of said at least one optical element in the working operating condition differs from the signal or data indicative of the operating condition of said at least one optical element in the unladen operating condition for a value greater than a predetermined second threshold.

12. The method according to claim 9, further comprising issuing an anomaly signal when the signal or data indicative of the operating condition of said at least one optical element in a current test cycle differs from the signal or data indicative of the operating condition of said at least one optical element in a preceding test cycle for a value greater than a predetermined third threshold.

13. The method according to claim 1, wherein said at least one optical element comprises a refractive optical element for collimating or focusing the power laser beam, adapted to modify a predetermined transverse power distribution of the power laser beam.

14. The method according to claim 1, wherein said at least one optical element further comprises a reflective optical element for deflecting the power laser beam.

15. The method according to claim 14, wherein said reflective optical element comprises a reflective optical element adapted to modify a predetermined transverse power distribution of the power laser beam.

16. The method according to claim 1, wherein said at least one optical element further comprises an optical protection element of a space of the optical propagation path, intended not to modify the transverse power distribution of the power laser beam.

17. A system for detecting an operating condition of at least one optical element arranged along an optical propagation path of a power laser beam in a processing head of a machine for laser processing of a material, in particular for laser cutting, drilling or welding said material, said power laser beam having a predetermined transverse power distribution at a predetermined operative wavelength, and said optical propagation path of the power laser beam within said processing head comprising a plurality of cascaded optical elements, the system comprising:
an electronic processing and control means;
a first sensor arranged upstream of said at least one optical element to detect a first optical radiation which propagates coaxially to the optical propagation path in a direction opposite to the direction of propagation of the power laser beam, having a wavelength corresponding to the wavelength of the power laser beam, wherein said electronic processing and control means acquires a first signal or data, $LS_C$, indicative of the first optical radiation;
a second sensor arranged upstream of said at least one optical element to detect a second optical radiation which propagates coaxially to the optical propagation path in an opposite direction to the propagation direction of the power laser beam, having a wavelength in near infrared range, wherein said electronic processing and control means acquires a second signal or data, $TS_C$, indicative of the second optical radiation;
a third sensor associated with said at least one optical element to detect a proximity optical radiation emitted by said at least one optical element at a wavelength comprised in infrared range in a first volume region in proximity to an upstream surface of the at least one optical element with respect to said optical propagation path, wherein said electronic processing and control means acquires a third signal or data, $IR_V$, indicative of the proximity optical radiation;
a fourth sensor associated with said at least one optical element to detect time-of-flight of an acoustic wave through the volume of said at least one optical element within which said acoustic wave is emitted, wherein the electronic processing and control means acquires a fourth signal or data, PS, which is a function of the time-of-flight; and
wherein said electronic processing and control means is further arranged to:
calculate a normalized signal or data of proximity optical radiation, $IR_{V\_norm}$, for said at least one optical element, as a function of the third signal or data, $IR_V$, indicative of the proximity optical radiation emitted by said at least one optical element, of the second signal or data, $TS_C$, indicative of the second optical radiation, and of the first signal or data, $LS_C$, indicative of the first optical radiation;
calculate a signal or data of real proximity optical radiation, $IR_{V\_real}$, for said at least one optical element, as a function of the normalized signal or data of proximity optical radiation, $IR_{V\_norm}$, and of the fourth signal or data PS that is a function of the time-of-flight of the acoustic wave launched through the volume of said at least one optical element; and
calculate a signal or data indicative of the operating condition, SS, of said at least one optical element, as a function of the signal or data of real proximity optical radiation, $IR_{V\_real}$, of the second signal or data, $TS_C$, indicative of the second optical radiation, and of the first signal or data, $LS_C$, indicative of the first optical radiation.

18. The system according to claim 17, wherein said electronic processing and control means are arranged for acquiring a pressure signal or data indicative of a current pressure of a gas present in a volume region to which the at least one optical element faces, or a pressure difference between the first volume region upstream of the at least one optical element and the second volume region downstream of the at least one optical element in a volume in which the at least one optical element is immersed.

19. The system according to claim 18, further comprising a fifth sensor associated with said at least one optical element adapted to provide said pressure signal or data.

20. The system according to claim 17, wherein said electronic processing and control means are arranged for acquiring signals or data indicative of parameters of a current working process and of signals or data indicative of production in progress and of a workpiece being processed, from working processing and control means of said machine.

21. A machine for laser processing of a material, in particular for laser cutting, drilling or welding said material, by a laser beam having a predetermined transverse power distribution at least one working plane of the material, the machine comprising:
- an emission source for emitting the laser beam;
- optical components for conveying the laser beam emitted by said emission source along an optical path for transporting the laser beam to a processing head arranged in proximity to said material;
- an optical path for shaping the laser beam along a propagation direction within the processing head towards a beam output, wherein said optical path comprises a plurality of cascaded optical elements; and
- means for controlling a mutual position between said processing head and said material, adapted to convey said laser beam along a processing path on the material, wherein said plurality of cascaded optical elements comprises:
- at least one refractive optical element for collimating the laser beam along an optical propagation axis incident on the material;
- at least one refractive optical element for focusing the collimated laser beam in an area of a working plane of said material; and
- at least one optical protection element of a space of the optical path, intended not to modify the transverse power distribution of the power laser beam, the machine further comprising a system for detecting an operating condition of at least one optical element of the optical path for shaping the laser beam according to claim 17.

22. A machine according to claim 21, wherein said plurality of cascaded optical elements further comprises at least one reflective optical element for deflecting the laser beam, adapted to reflect the collimated laser beam towards a direction of incidence on said material, and adapted to modify a predetermined transverse power distribution of the power laser beam.

* * * * *